No. 740,052. PATENTED SEPT. 29, 1903.
J. B. SMITH.
SPINDLE NUT.
APPLICATION FILED JULY 15, 1903.
NO MODEL.
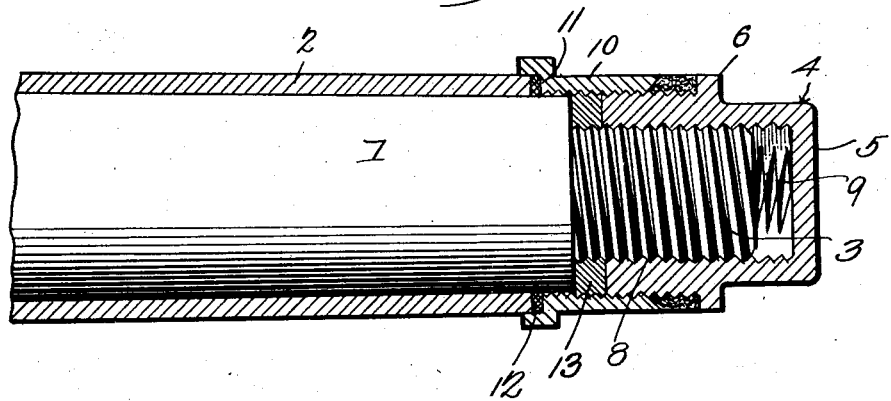
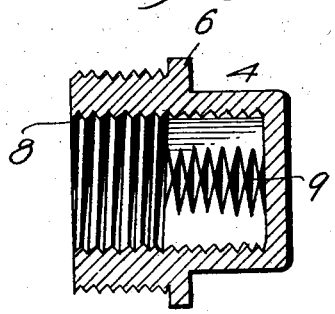 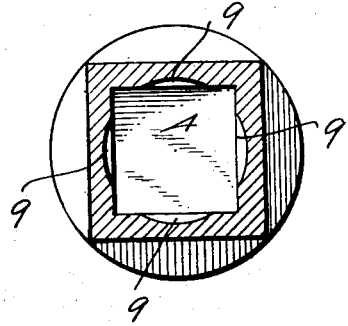
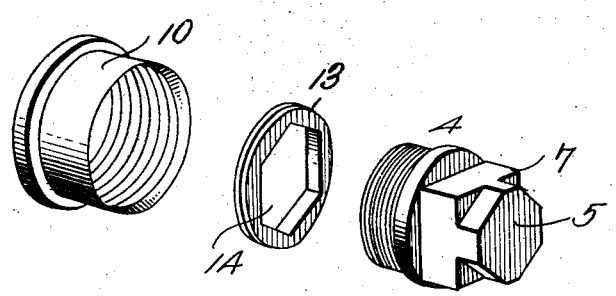
Witnesses J. B. Smith, Inventor.
by Attorneys No. 740,052. Patented September 29, 1903.

UNITED STATES PATENT OFFICE.

JAY B. SMITH, OF VINTON, LOUISIANA.

SPINDLE-NUT.

SPECIFICATION forming part of Letters Patent No. 740,052, dated September 29, 1903.

Application filed July 15, 1903. Serial No. 165,610. (No model.)

*To all whom it may concern:*

Be it known that I, JAY B. SMITH, a citizen of the United States, residing at Vinton, Calcasieu parish, State of Louisiana, have invented a new and useful Spindle-Nut, of which the following is a specification.

This invention relates to axle-nuts, and it is particularly intended to be used as a preventive against the rattling of the axle-box by taking up the wear, so as to prevent looseness of the wheel. It is furthermore contemplated to provide means for conveniently adjusting the coöperating parts with relation to each other.

Further objects and advantages of this invention will be specifically set forth in the following description, it being understood that slight changes in the form and proportion may be made without departing from the spirit of this invention.

In the drawings, Figure 1 is a vertical longitudinal sectional view of the device applied. Fig. 2 is a sectional view of the nut members. Fig. 3 is a cross-sectional view of the nut member, and Fig. 4 is a fragmentary detail perspective view of the device.

The reference-numerals 1 and 2 designate a spindle and axle-box, respectively, of any standard construction, the spindle having the usual reduced end 3.

The nut comprises two members, one of which is sleeved upon the other, the sleeved member having a threaded interior, which receives both the other member and the washer. The nut member 4 is of substantially tubular form, one end being open and the opposite one being closed by a head 5, at the juncture of which with the tube is an annulus 6, the head being angular in cross-section and having a portion 7 set off and of polygonal form. The interior of the tube is provided with rows of continuous threads 8 for a portion thereof and broken rows of threads 9 for the remaining portion of the interior. The portion in rear of the continuous rows of threads is substantially rectangular, the side walls being threaded, leaving the intervening corner spaces free for the reception of a lubricant, so as to insure the threads being lubricated. The sleeve member 10 is internally threaded, so as to be adjustable on the member 4, the end of the sleeve 10 abutting against the annulus 6 when the parts are connected. This sleeve is also provided with an annular groove 11 for the reception of a washer 12, and within the open end of the sleeve is an adjustable washer 13, adapted to take any wear upon the end of the axle-box, so that the part will be prevented from rattling. When the nut is in position upon the spindle, the washer will be interposed between the ends of the axle-box and the member 4, and as the wear is to be taken up upon the axle-box the washer 13 can be adjusted by removing the member 4 and reversing it, so that the polygonal portion of the head will engage with a correspondingly-formed concentric opening 14 in the washer. After the washer has been properly adjusted the member 4 can again be secured to the sleeve and held in place, as heretofore set forth.

Having thus described my invention, what I claim is—

1. An axle-nut comprising two members, one of which is sleeved upon the other and an adjustable washer carried by sleeved member and capable of contact with the end of the other member.

2. An axle-nut comprising two members one of which is relatively movable upon the other and provided with an angular head and a washer carried by the other member and provided with an opening coinciding with the angular head.

3. The combination with two members, one movable upon the other, of a washer within one of the members and having opposing faces one of which bears against the end of one of the members.

4. In a device of the class described, the combination with a spindle having an axle-box thereon, of a nut threaded on the spindle and having a sleeve thereon, said sleeve being internally threaded and provided at one end with a washer-seat, and an adjustable washer within the threaded portion of the sleeve to contact with the end of the complementary member of the sleeve, and with the axle-box.

5. In a device of the class described, the combination with an internally-threaded sleeve, a nut member internally and externally threaded and fitting in the sleeve and provided with an annulus bearing upon the edge of the sleeve, and an adjustable washer within the sleeve and bearing against the end of the nut member.

6. In a device of the class described, two members one of which is sleeved upon the other, the latter having tubular portion, part of which is approximately rectangular in cross-section and provided with threads.

7. In a device of the class described, two members one of which is provided with a tubular spindle-engaging portion, having continuous rows of threads and broken rows of threads.

In testimony that I claim the foregoing as my own I have hereto affixed my signature in the presence of two witnesses.

JAY B. SMITH.

Witnesses:
A. L. PERRY,
J. L. PERRY.